United States Patent
Heenan et al.

(10) Patent No.: US 11,281,916 B2
(45) Date of Patent: Mar. 22, 2022

(54) METHOD OF TRACKING OBJECTS IN A SCENE

(71) Applicant: TRW LIMITED, Solihull (GB)

(72) Inventors: Adam John Heenan, Chesterfield (GB); Martin John Thompson, Solihull (GB); Ignazio Indovina, Manchester (GB)

(73) Assignee: TRW LIMITED, Solihull (GB)

( * ) Notice: Subject to any disclaimer, the term of this patent is extended or adjusted under 35 U.S.C. 154(b) by 443 days.

(21) Appl. No.: 16/470,450

(22) PCT Filed: Dec. 15, 2017

(86) PCT No.: PCT/GB2017/053771
§ 371 (c)(1),
(2) Date: Jun. 17, 2019

(87) PCT Pub. No.: WO2018/109499
PCT Pub. Date: Jun. 21, 2018

(65) Prior Publication Data
US 2021/0357661 A1 Nov. 18, 2021

(30) Foreign Application Priority Data
Dec. 15, 2016 (GB) .................................... 1621404

(51) Int. Cl.
*G06K 9/00* (2006.01)
*G06T 7/00* (2017.01)
*G06T 7/277* (2017.01)

(52) U.S. Cl.
CPC .......... *G06K 9/00791* (2013.01); *G06T 7/277* (2017.01); *G06T 7/97* (2017.01); *G06T 2207/30252* (2013.01)

(58) Field of Classification Search
CPC ....... G06K 9/00791; G06T 7/277; G06T 7/97; G06T 2207/30252
See application file for complete search history.

(56) References Cited

U.S. PATENT DOCUMENTS

| | | | |
|---|---|---|---|
| 6,665,439 B1 * | 12/2003 | Takahashi | G06K 9/0063 |
| | | | 382/165 |
| 2003/0103682 A1 * | 6/2003 | Blake | G06T 7/12 |
| | | | 382/282 |
| 2010/0128930 A1 * | 5/2010 | Liu | G06K 9/00771 |
| | | | 382/103 |

OTHER PUBLICATIONS

Manz, Michael, Thorsten Luettel, Felix von Hundelshausen, and Hans-Joachim Wuensche. "Monocular model-based 3D vehicle tracking for autonomous vehicles in unstructured environment." In 2011 IEEE International Conference on Robotics and Automation, pp. 2465-2471. IEEE, 2011. (Year: 2011).*

(Continued)

*Primary Examiner* — Carol Wang
(74) *Attorney, Agent, or Firm* — Tarolli, Sundheim, Covell & Tummino LLP

(57) ABSTRACT

A method of detecting objects located in an environment around a vehicle, comprises the steps of obtaining a 2D image of a scene from an image capture device fitted to the vehicle, generating a set of particles that each comprise a set of parameters that define the state of at least one object that may be present in the scene, calculating an edge strength and edge direction for each pixel of the captured 2D image; and for each particle in the set: generating a 3D probabilistic model of the object that is associated with the particle, the model defining a set of edges of the object, each edge in the model defined by at least one likelihood function defining a probabilistic distribution of at least one characteristic of the edge, mapping the likelihood functions of the probabilistic model into the 2D plane of the captured image as a function of the parameters of the particle; and processing the edge (Continued)

strength and edge direction values with the probability values to determine the likelihood that the particle defines the state of an object present in the environment.

12 Claims, 14 Drawing Sheets

(56) References Cited

OTHER PUBLICATIONS

Aborisade, David O. "Novel fuzzy logic based edge detection technique." International Journal of Advanced Science and Technology 29, No. 1 (2011): 75-82. (Year: 2011).*

Wüthrich, Manuel, Peter Pastor, Mrinal Kalakrishnan, Jeannette Bohg, and Stefan Schaal. "Probabilistic object tracking using a range camera." In 2013 IEEE/RSJ International Conference on Intelligent Robots and Systems, pp. 3195-3202. IEEE, 2013. (Year: 2013).*

Taiana M., et al., "Tracking objects with generic calibrated sensors: An algorithm based on color and 3D shape features." Robotics and autonomous systems, vol. 58 (Jun. 2010) pp. 784-795.

Taguchi Y., et al., "Rao-Blackwellized Particle Filtering for Probing-Based 6-DOF Localization in Robotic Assembly" (May 2010) pp. 2610-2617.

Saito M., et al., "Probalisitc Appearance Based Object Modeing and its Application to Car Recognition", (Aug. 2010) 2360-2363.

* cited by examiner

Figure 12(b) location

Figure 12(c) orientation

Figure 12(d) strength

Figure 12(e) total

Final likelihood value

METHOD OF TRACKING OBJECTS IN A SCENE

RELATED APPLICATION

This application corresponds to PCT/GB2017/053771, filed Dec. 15, 2017, which corresponds to British Application No. 1621404.1, filed Dec. 15, 2016, the subject matter, of which are incorporated herein by reference in their entirety.

This invention relates to a method of tracking objects located in a scene around a host object, and may also relate to the tracking of those objects around the host object. It may be used in the control of an autonomous vehicle when used to identify objects that may lie in the path of the vehicle.

There is a wide range of applications in which it would be beneficial or essential to identify objects and to track them. The operation of autonomous vehicles is one application, in which a vehicle must be able to identify and avoid objects such as cars and pedestrians as it drives along a road or off-road. Because many objects may themselves be moving, such as other vehicles, being able to track them allows the autonomous vehicle to predict where they will be in the future and better plan a safe route through the environment.

Identifying objects and tracking them is a non-trivial exercise and requires a lot of signal processing. Many techniques are known but all require a data feed, such as a set of video images, which can be processed to track objects and then to identify their location. This could be a forward-facing camera fitted to a host vehicle, or a set of cameras, or perhaps a radar or lidar system.

One known technique for determining the position of an object, within 3D space, is to use a particle filter to process information about the speed of the vehicle with a map of the environment. In use, a set of particles may be generated which each represent a hypothesis, either random or pseudo random, for the location of the vehicle. Measurement data is fed into the particle filter such as the distance of a feature identified in the map, and this is used to assign a probability to each particle. Those particles with a low probability are then dropped and more particles are produced in the vicinity of those with the highest probability. Over time, the particle filter should converge on the location of the host vehicle in the mapped environment until some probabilistic measure indicates that that an object is at a given location defined by the states of the particles. Alternatively, the probabilistic measure could be used directly in the control system or higher level fusion. The inclusion of higher order states and a motion model in the particle filter allows the particle filter to track object position, velocity, acceleration, etc. directly.

The use of the particle filter can be modified to identify objects that may or may not be present around the host vehicle. This is achieved by feeding into the particle filter a model of an object that is being looked for. Particles are generated at random or pseudo random that define the state of a potential object and the state of each particle is then used to project a wire frame image of the object into the image plane. The image is passed through an edge detector and the strongest edges in the image are retained to form a wire frame image. The projected wire frame model is then overlaid on the edges to see how well they match. If they do match, a particle is retained as a match and if not it is rejected. If the model and edges do not match then more particles are generated until a match is found.

In a real environment the object may be at a range of orientations and, to accommodate this, the wire frame model must be manipulated prior to the matching to correspond with how the wire frame will look in the image frame. This must be repeated for lots of different orientations, which is computationally intensive. Similarly, where there are lots of different objects that are to be located, lots of different wire frames are needed. Because the object may be located at a range of different distances, it is also necessary to scale the wire frame model and repeated the processing for the different scaled wire frames to see if the model matches objects in the 2D image. Consider for example the simple case of identifying cars on a road; as there are lots of different cars, lots of different wire frame models are needed, which may, for example, correspond to different vehicle types or even particular manufacturer models.

Despite the requirement of lots of computation, the applicant has appreciated that particle filtering can be advantageous because by the time an object has been identified the direction of travel and speed of movement of the object relative to the host vehicle will also have been estimated.

The object of the present invention is to provide a method of identifying the location of objects in a scene that can be carried out using fewer computations than prior art techniques such as known uses of particle filtering.

According to a first aspect, the invention provides a method of detecting objects located in an environment around a host object, comprising the steps of:
(a) obtaining at least one 2D image of the scene from an image capture device fitted to the host object,
(b) generating a set of particles that each comprise a set of parameters that define the state of at least one object that may be present in the scene,
(c) calculating an edge strength and edge direction for each pixel of the captured 2D image; and for each particle in the set:
(d) generating a 3D probabilistic model of the object that is associated with the particle, the model defining a set of edges of the object, each edge in the model defined by at least one likelihood function defining a probabilistic distribution of at least one characteristic of the edge
(e) mapping the likelihood functions of the probabilistic model into the 2D plane of the captured image as a function of the parameters of the particle; and
(f) processing the edge strength and edge direction values produced in step (c) with the probability values mapped in step (e) to determine the likelihood that the particle defines the state of an object present in the environment.

The edge strength and edge direction values may be stored as an edge image in a memory in step (c) for subsequent processing in step (f).

The likelihood function may comprise a probabilistic distribution of the location of the edge. This function therefore defines the edge in the model in terms of the probability that the edge may be present in a given position in 3D space.

The likelihood function may comprise a probabilistic distribution of the direction of the edge. This function therefore defines the edge in the model in terms of the probability that the edge feature may be present with a particular angular orientation in 3D space relative to one or more other edges in the set.

The step (C) of assigning an edge direction and edge strength may be performed using any suitable edge detection algorithm, For example, the edge direction and edge strength may be given by edge detection kernels which look at pixels in a region around the pixel to which the values are to be assigned. For example a Sobel "mask" may be used that has a one pixel boundary around the current pixel which means it uses 3×3 pixel masks which is convolved with the image. There is one mask for vertical edge strength and one mask for horizontal edge strength. The direction comes from the arctan of the vertical and horizontal edge strengths. This is well known in image processing and other edge detection masks exist.

This may comprise a cluster of pixels centered on the pixel that the edge direction is to be assigned to. The same sized cluster may be used for each pixel, but smaller sizes could be used, for instance at an edge of the image.

The step of assigning an edge strength may comprise determining the frequency content of or a defined area immediately surrounding each pixel. This may be the same defined area used in determining the edge direction value.

The parameters defining the state of each particle may include one or more of the overall location in 3D space of the object relative to the location of the host object, the orientation and the direction of travel and speed of travel of the object through the 3D space relative to the space or relative to the host object, the rate of acceleration of the object relative to the host vehicle, and the ambient light conditions (e.g. night, dark, or daylight). The parameters may also identify the fuzzy model for the object defined by the particle, i.e. what the object is.

Each edge in the fuzzy model may additionally be defined by a probability function defining the strength of the edge. This strength may be defined absolutely or relative to the strength of other edges in the model of the object. By strength we mean how clear the edges of the object will appear in the image in terms of the variation in colour or intensity across the edge. The edges of the model corresponding to the brake lights may be relatively strong, for example, when the lights are operating, and relatively less strong when not.

The method may in step (f) process all edges in the image obtained in step (c) that lie within a region or window corresponding to the mapped 2D model. By using all identified edges regardless of strength but instead assigning a weighting to the edge indicative of the strength, the method is capable of object-detection in low-light or changeable-light conditions or, for example, where other environmental conditions such as weather may reduce the strength of some edges. The lower weighting of the edges will result in less certainty of detection but allows a system using the method to degrade gracefully in its ability to detect objects rather than to simply stop working in certain conditions.

When thresholding is used, information from the image is necessarily lost. Furthermore, it becomes necessary to have an adaptive threshold which compensates for changeable light levels or other environmental factors, the threshold requiring tuning. The applicant has therefore noted that it is more productive to utilise all of the data. Productivity is additionally improved where a parallel-processing system is utilised, 'decisions' being expensive to processing power whereas parallel processing of each pixel—and relying on the low weighting of low strength edges—in the same manner is far more efficient.

Of course, the invention could apply some low level thresholding to remove some edges from the captured image within some aspects of the scope of the invention, which may be applicable with especially noisy environments with lots of objects.

By using a fuzzy model of an object where each edge feature is defined as one or more probability functions, for example representing a range of possible locations or orientations or strengths of an edges relative to other edge features along with a probability that the edge is present at a point in that range, rather than a precise wire frame model, and by processing this with all edges in the relevant region of the image rather than only looking at the strongest edges, it is possible from that one fuzzy model to identify a range of possible objects in the scene as long as the object has characteristics defined by the relative location of the edges of the object that fit the model. This reduces the number of models needed to be able to track and identify different objects. By repeating the process many times, the state of an object can be identified with a high degree of probability despite the fuzziness of the model.

Each edge may be defined with a centre position or direction or strength and a range which has the highest probability and with a range of probability values either side of the centre that are as high or lower until the edge of the range is reached where the probability may be set to zero. This range of probabilities may be expressed for each edge in the fuzzy model by a likelihood function which links the positon, direction or strength to the centre value as an X-Y plot where the centre value lies on the Y axis.

There may be multiple likelihood functions associated with each edge, each function having a probability distribution specifically associated with a corresponding portion of an edge.

The fuzzy model may include likelihood functions that define a narrower range of probable locations, directions or strengths where there is a great deal of commonality between different objects that fit the model at that edge, and a wider range of probable locations, directions or strengths of the edge where there is a less commonality between different objects across the set of objects that fit the model.

The step of generating the fuzzy model may comprise a step of retrieving the model from an electronic memory or wirelessly from a remote server.

Models may be generated for a variety of different objects. For example, the fuzzy model may comprise a model of a vehicle such as a passenger car and may include edges with associated likelihood functions that will fit a large number of different passenger cars. The set may, for example, include four curved edges forming circles corresponding to the wheels. As different cars will have different wheelbases and different wheel sizes, the probability values assigned to those curved edges will cover the expected range of wheel sizes and relative wheel positions. Hence, any edges in the image that define a circle within the range of probable sizes and positioned relative to each other within the range of probable wheelbases will result in a high probability that an object is a vehicle. The centre value of a circle may correspond to a diameter of approx. 50-70 cm, a fairly common wheel size, and the range may vary either side of this centre by 10-20 cm with a stepped probability to reflect that wheels on vehicles are common in a finite number of common sizes.

Where the model is a model of a vehicle, the edges may include the perimeter of the wheels, the top of the roof, the lower edge of the sills, the forward most and rearmost edges, the outline of the headlights and outline of the brake lights, the edge of the body sides. The model may also include one or more edges corresponding to the location of a shadow below an object that may be present in the scene. This is an example of an edge that is associated with an object but not part of the object but which can still form part of the model.

The edges for the lower body side and the shadow may have a likelihood function that has a narrow spread meaning the edge location will vary little between different passenger car objects, but the roof line may have a much wider spread.

The step (e) of mapping the probability distribution defined by the likelihood functions of the fuzzy model into the 2D plane of the captured image as a function of the state of the particle may comprise assigning a set of probability values to each pixel in the image, each one being defined by the set of likelihood functions for the model. These may be calculated by mapping the functions into the image plane and calculating the perpendicular distance of the pixel from a centre value of each function and then looking up the location likelihood values for that distance, and assigning the direction and strength likelihood values from each edge independent of the distance. Thus, where three different functions are used for each edge then a pixel will have three likelihood values associated with that edge assigned to it. These sets may be merged by summing all of the probabilities corresponding to all likelihood functions of the same characteristic, e.g. all the location probability values can combine to form one value for the pixel and all the direction probability values can combine to form another for that pixel.

The likelihood value for each particle may be calculated in a variety of different ways. In one arrangement the calculation may be made as shown in the pseudo code below:

For each particle
  For each projected edge feature
    For each pixel position
      Calculate likelihood value "a" based on edge magnitude
      Calculate likelihood value "b" based on edge orientation
      Calculate likelihood value "c" based on edge distance
      Calculate a combined pixel likelihood value by multiplying a, b and c.
    Calculate a combined pixel likelihood value by summing all the pixel likelihood values
  Calculate a combined particle likelihood value by multiplying the edge likelihood values.

In one modified arranged, pixels with zero edge magnitude likelihood could optionally be excluded from the likelihood calculations because they will automatically eliminate the need to calculate the distance and orientation likelihood but this is an optimisation and is not necessary.

The step (f) of processing the edges in the image with the probability values from the model may comprise for each pixel in the edge detected image assigning one or more of the edge values and multiplying each value by the probability value for the location corresponding to that pixel.

In use, if a pixel lies near to a predicted edge and the probability value for the location of an edge in the model is high for that pixel then the method will produce a high likelihood value for location for that pixel. The method may do the same for orientation and strength to get two further likelihood values for the pixel, where those likelihood functions are used.

The method may comprise summing all of the likelihood values produced for each pixel to produce the overall combined pixel likelihood value. The method may further comprise multiplying the combined pixel likelihood values to give an overall likelihood value indicative of the probability that the particle is present in the scene.

The method may process all pixels in the capture image, or only a subset that cover an area that is in a suitable region or window around the image location predicted by the mapped particle states.

The step of mapping the model may also comprise applying a transform to the model dependent on the properties of the device used to capture the image. This will enable distortions to be compensated if required.

The method may be implemented using images captured from a single image capture device. This may comprise a camera which outputs a colour or mono-chrome or pseudo colour image.

Alternatively, the method may comprise capturing images from more than one image capture device, each having a different field of view of the scene, and a different transform may be applied to the model for each camera to enable correct mapping of the likelihood function parameters into the image space of each image capture device. This allows the use of images from multiple image capture devices with a common set of particles, i.e. sharing a common set of particles.

Where two capture devices are provided, they may each capture a view of the scene from a different location and orientation, the two views overlapping so that predicted objects are present in captured images from both capture devices, or in some cases may not even overlap.

The method may use information about the different fields of view in the step of determining the probability of a particle corresponding to an object to provide an increased accuracy relative to the use of one of the capture devices.

The capture devices may comprise video cameras.

The method may comprise monitoring the status of each capture device, and in the event that one is at fault using only images from the non-faulty device to produce edge detected images for processing with the mapped fuzzy model. This allows for resilience in the event of a fault.

The method may comprise, after processing each particle, a further step of generating a new set of particles in the region of the particles in the initial set that were given relatively higher likelihoods, and repeating the method for those new particles. This may be repeated as long as the method is running to refine the particles. The method will detect objects whose position and motion around the host object correspond to the sequence of states predicted by the particles over recent time. The method when using this recursive process may be considered to function as traditional particle filter with a novel likelihood function.

According to a second aspect the invention provides a objection detection apparatus for locating at least one object in an environment around a host object, comprising:

(a) an image capture device fitted to the host object which in use obtains at least one 2D image of the environment, (b) a processing means arranged in use to generate a set of particles that each comprises a set of parameters that define the state of at least one object that may be present in the scene, (c) calculating an edge strength and edge direction for each pixel of the captured 2D image for the production of an edge image; and in which the processing device is further arranged in use to process each particle in the set by the following steps:

(d) generating a 3D probabilistic model of the object that is associated with the particle, the model defining a set of edges of the object, each edge in the model defined by at least one likelihood function defining a probabilistic distribution of at least one characteristic of the edge (e) mapping the likelihood functions of the probabilistic model into the 2D plane of the captured image as a function of the parameters of the particle; and (f) processing the edges identified in the image in step (c) with the probability values mapped in step (e) to determine the likelihood that the particle defines the state of an object present in the environment.

The processing means may comprise a signal processor that generates the model from a set of stored parameters, or that retrieves the model from an area of electronic memory in which the model is stored. The apparatus may include the electronic memory or the memory may be located remotely and accessed wirelessly.

There will now be described by way of example only two embodiments of the present invention with reference to and as illustrated in the accompanying drawings of which:

Figure 10A:
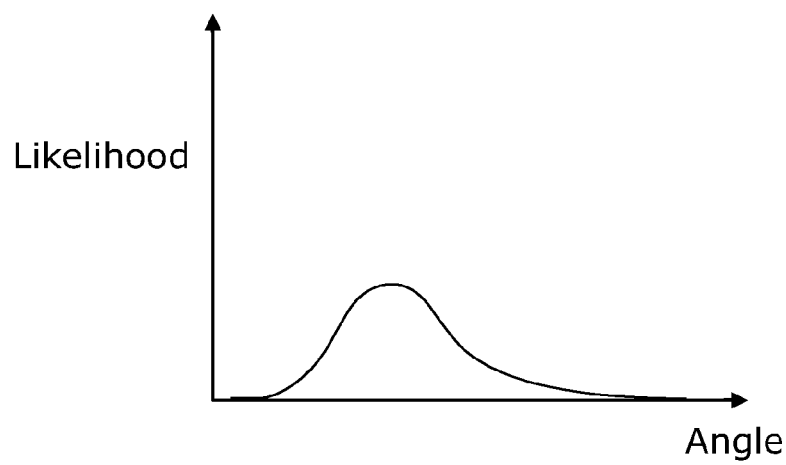
Figure 10B:
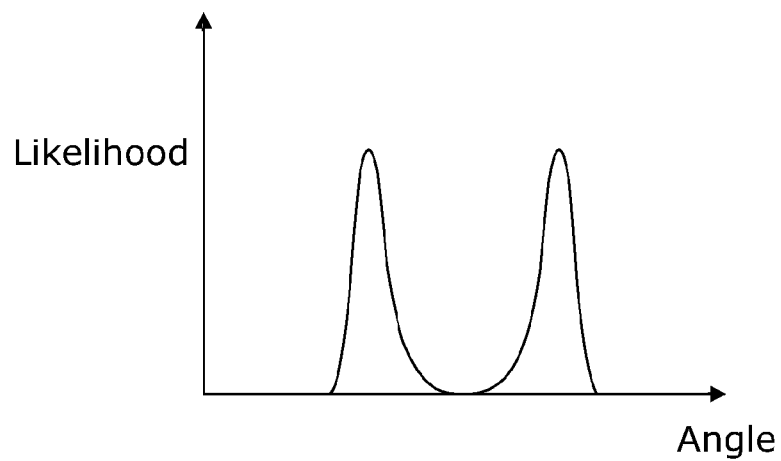
Figure 11:
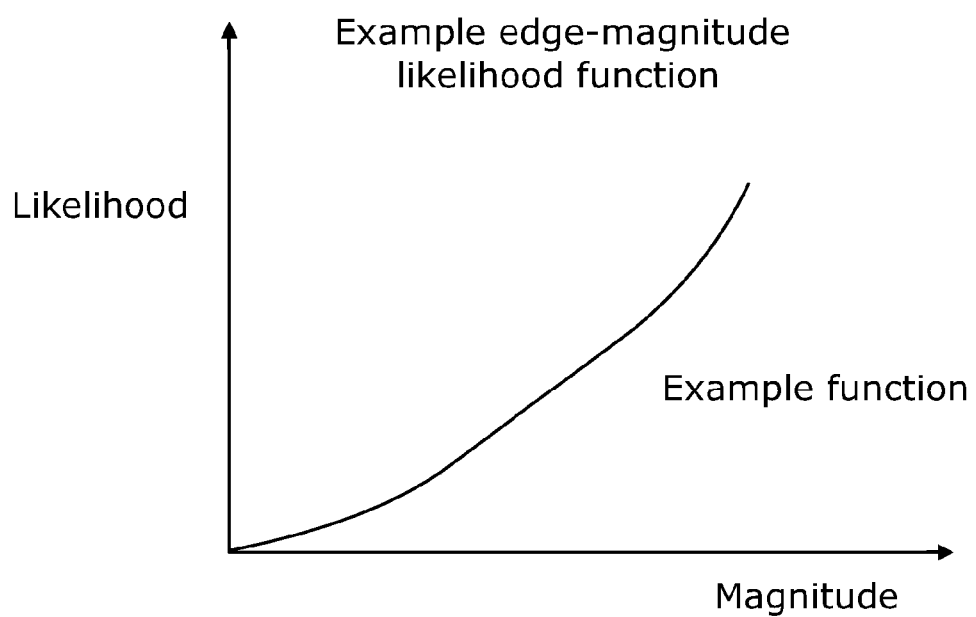
Figure 12A:
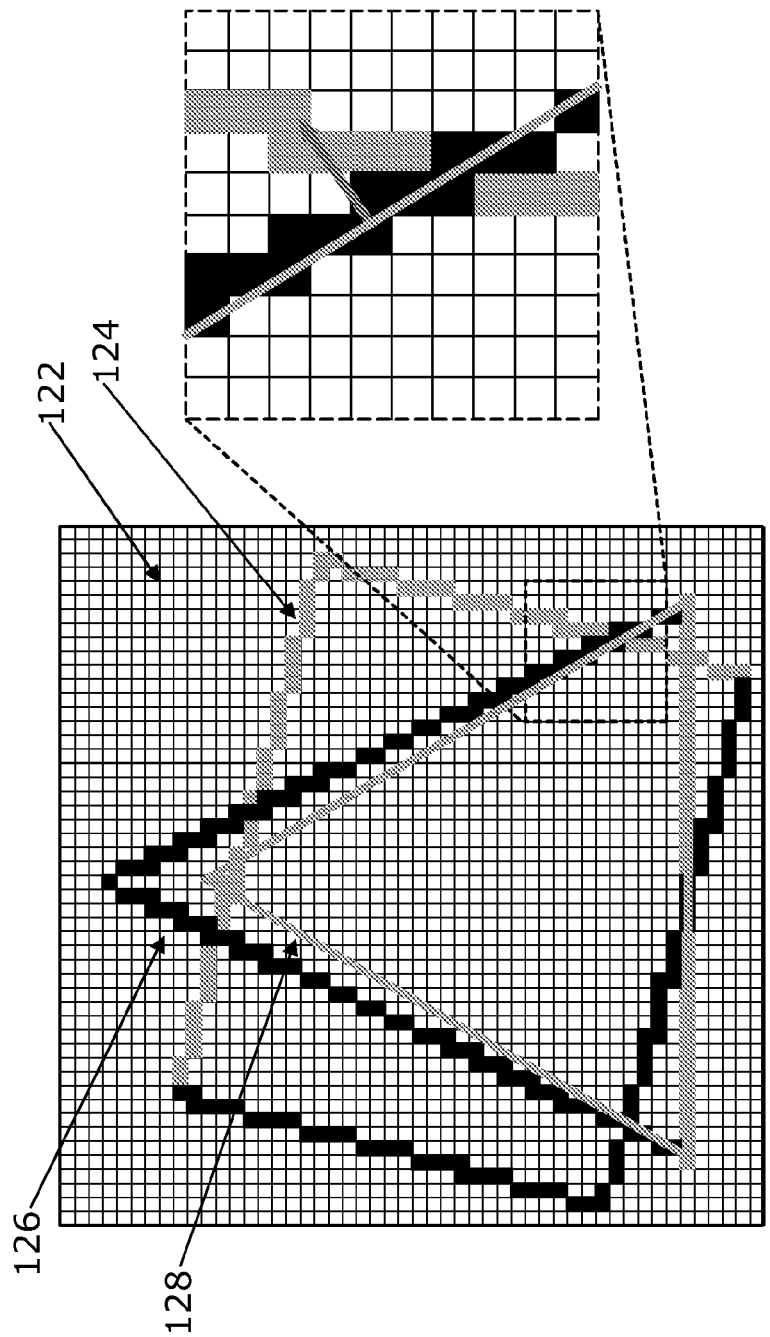
Figure 13:
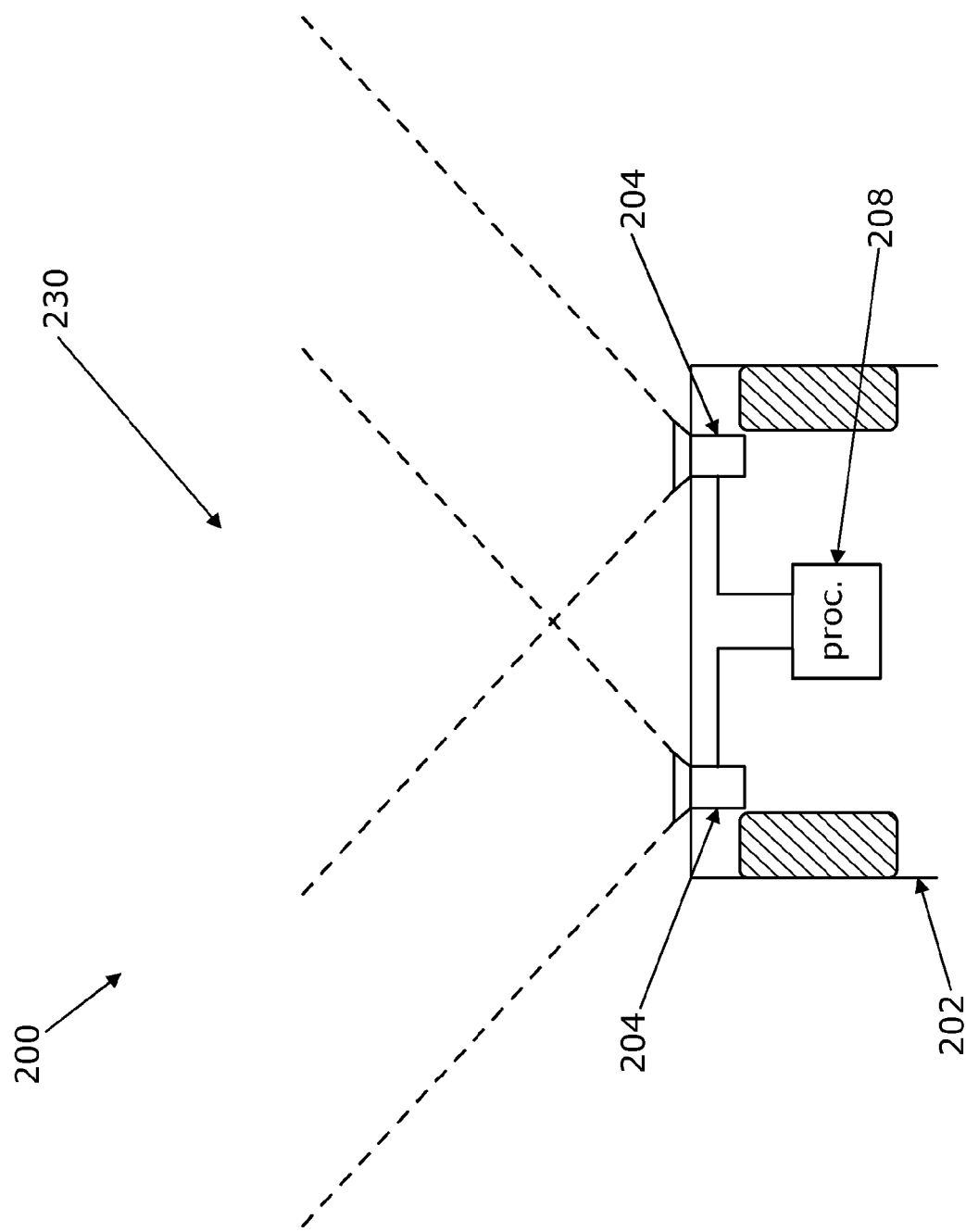
Figure 14:
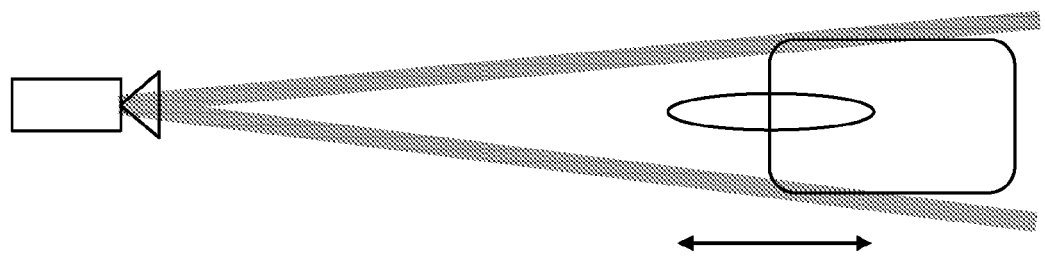
Figure 14:
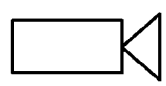
Figure 15:
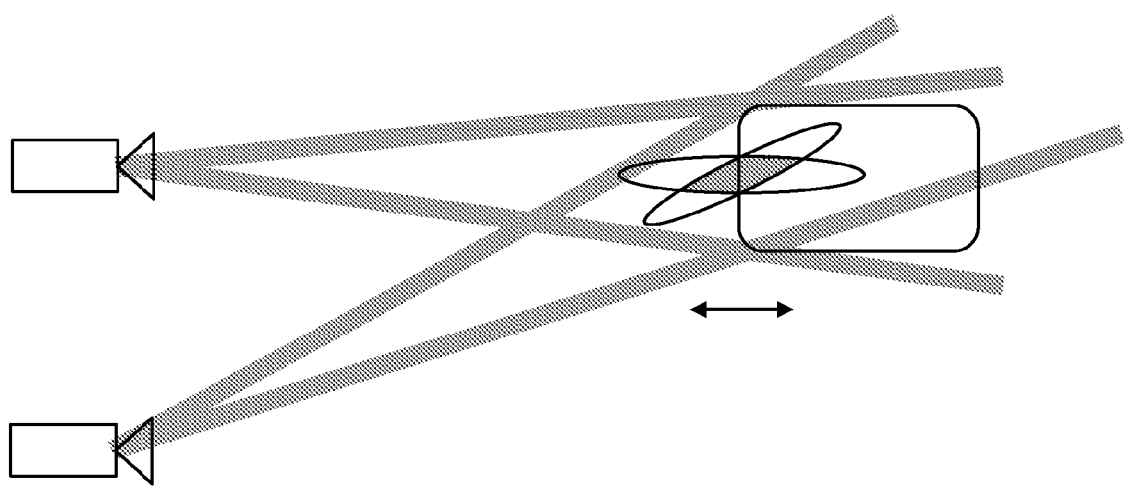
Figure 16:
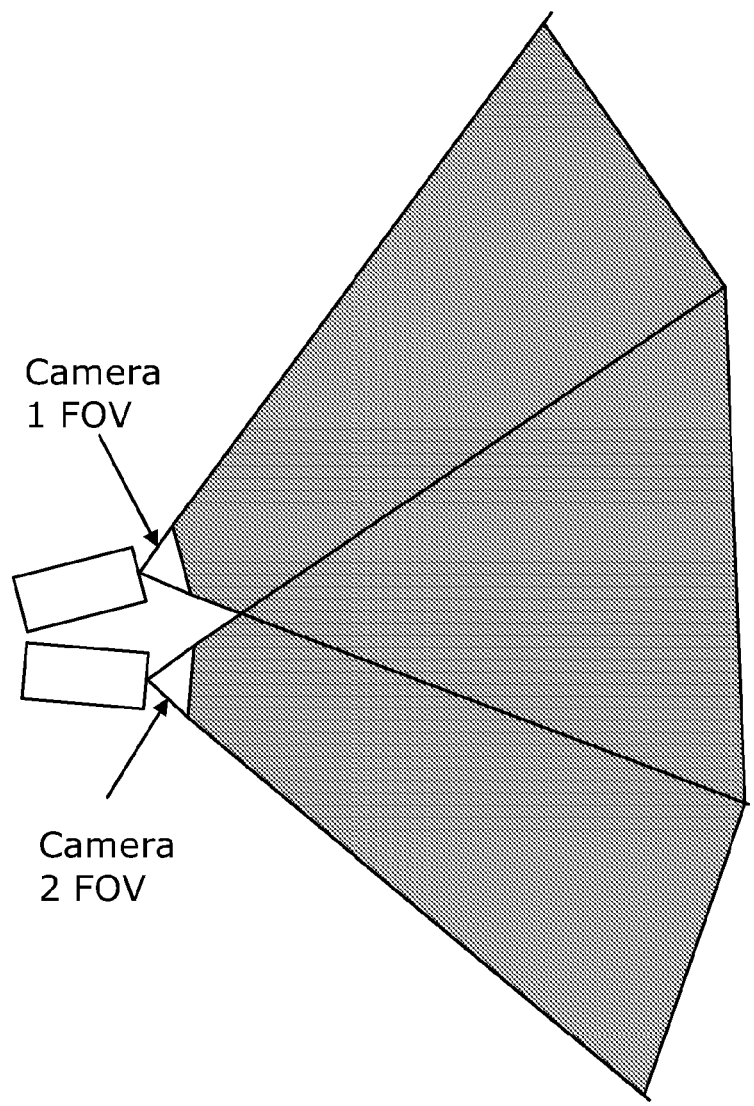
Figure 17:
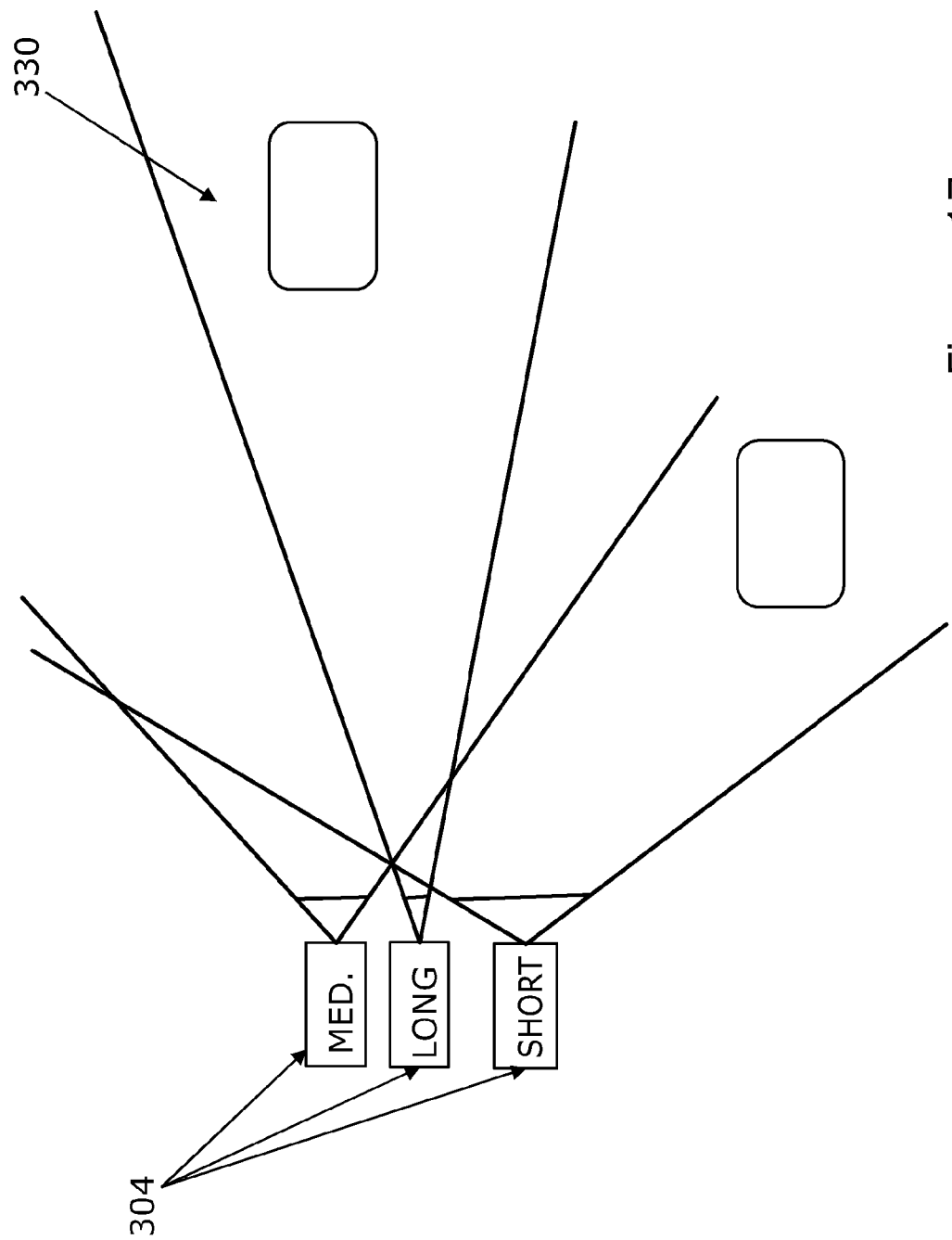

FIGS. 10 (a) and (b) are examples of likelihood functions for direction that may be used in the method, showing a lack of threshold;

FIG. 11 is an example of a likelihood function for edge strength again showing a lack of threshold;

FIG. 12 (a) to (e) illustrate the steps performed by the method to arrive at a single likelihood value for each particle FIG. 13 shows a second embodiment of an object detection apparatus, which includes two cameras;

FIG. 14 depicts the field-of-view of the second embodiment when a single camera is operational;

FIG. 15 depicts the field-of-view of the second embodiment when both cameras are operational;

FIG. 16 shows the overlapping area of the two cameras of the second embodiment, showing the available redundancy and accuracy; and FIG. 17 shows a third embodiment of an object detection apparatus, which includes three cameras with different focal lengths.

Figure 1:
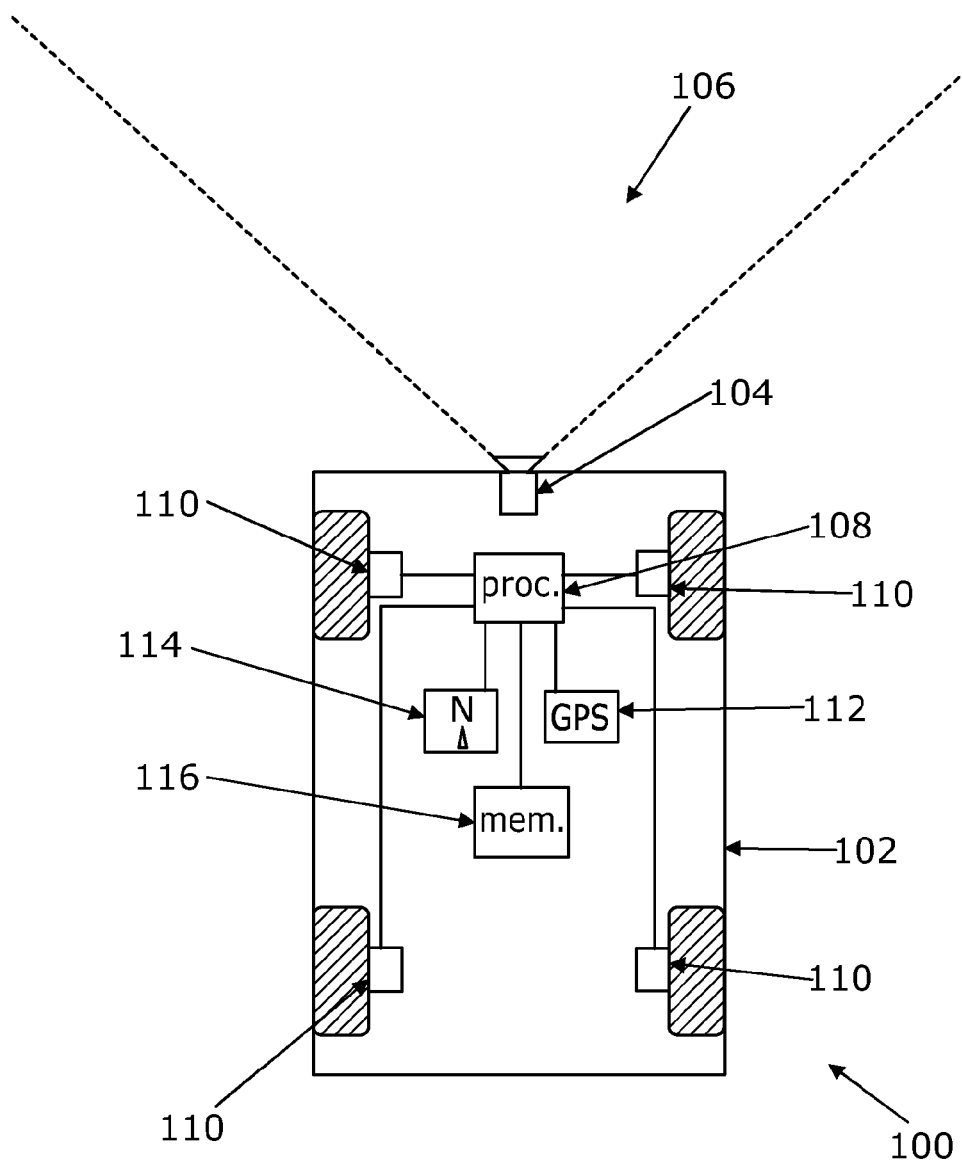
FIG. 1 shows a first embodiment of an object detection apparatus capable of performing the method of the first aspect of the invention.

FIG. 1 of the accompanying drawings shows a first embodiment 100 of an object detection apparatus capable of performing the method of the first aspect of the invention.

The apparatus 100 in use is fitted to a host object such as a car 102 that moves through an environment and will identify target objects in a scene 106 in the vicinity of the car. This may be used by a processing system fitted to the car in order to autonomously guide the car through the environment whilst avoiding colliding with those objects. Typical objects in an on-road environment include other cars, lorries, cyclists and pedestrians that may also be moving through the environment, as well as fixed objects such as street furniture. In an off-road environment objects such as rocks and trees may also be present.

The apparatus comprises a video camera 104 which in this example faces forwards of the vehicle 102 and has a wide enough field of view to capture a scene which includes all regions of the environment into which the vehicle may move when it is travelling forward, regardless of the steering lock applied. As such images captured by the camera 104 will include any objects that may be in the path of the host car. It is within the scope of the invention for the camera to only capture a part of the scene. There may be a secondary system for tracking objects in other parts of the scene or it may be sufficient to only track objects in a selected area, for instance close to the vehicle.

The output of the video camera 104 comprises a series of 2D images that are fed into a signal processor. The frame rate of the camera determines how often the image is refreshed, although the processor need not process every frame captured by the camera.

In addition, the signal processor receives information about the position, orientation and movement of the vehicle through the environment. A wheel speed sensor 110 may be used to provide information about the speed, acceleration and jerk of the host vehicle, and GPS or GLONASS signals may be used to provide the positional information from a positioning device 112. Orientation may be obtained from a digital compass 114 fitted to the vehicle.

The apparatus includes an area of digital memory 116 in which are stored program instructions that are run by the processor, and also stores at least one fuzzy model corresponding to a type of object that may be present in the environment. In this example it is assumed that one model is stored corresponding to a hatchback style road car. The skilled person will understand that the model and indeed the processing that will be described herein after may be performed remotely from the host vehicle by connecting the processor wirelessly to a processor and memory located remotely.

Figure 2:
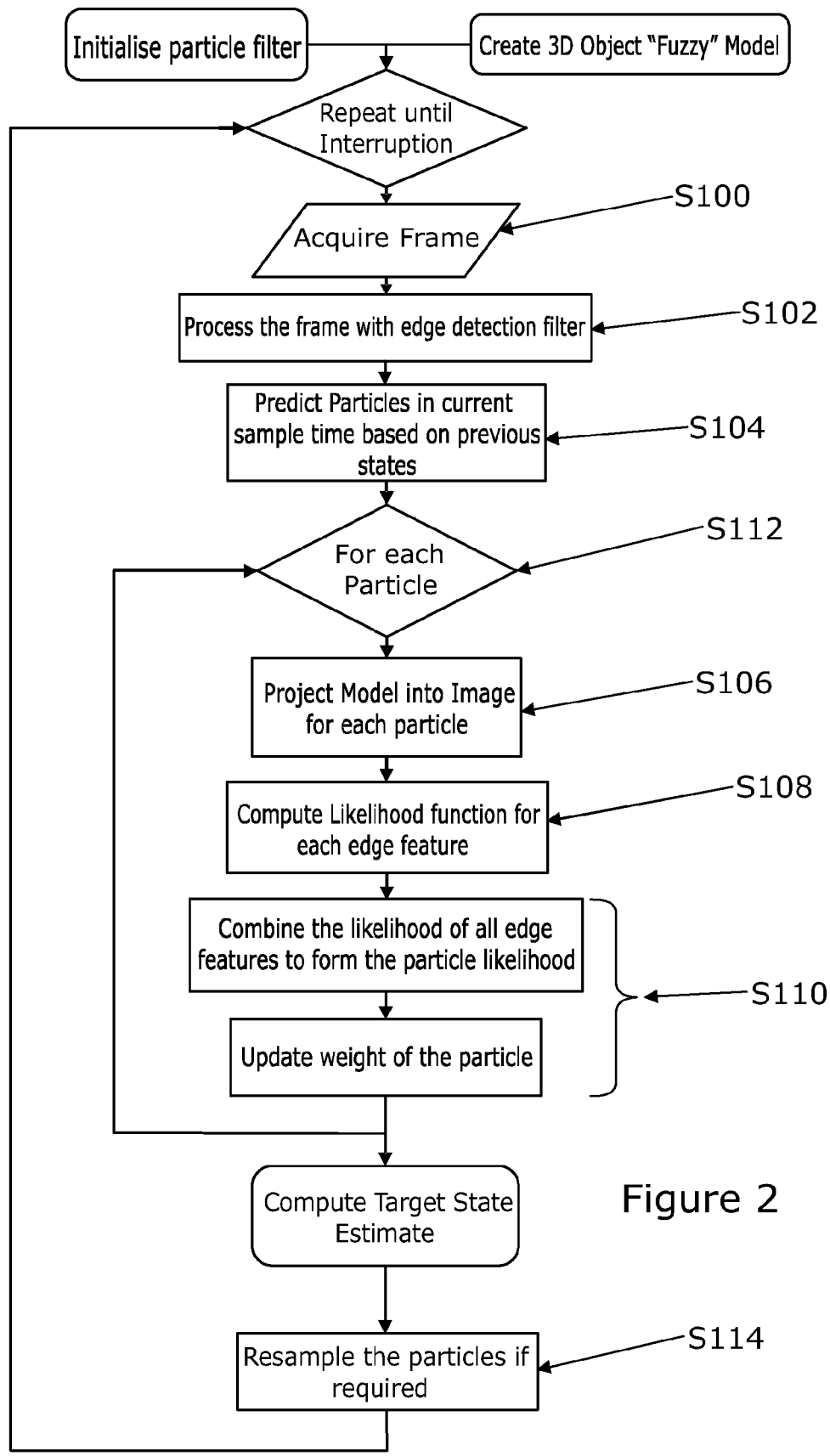
FIG. 2 is a simple flow chart of the method of the first aspect of the invention.

The processor carries out the steps shown in FIG. 2 of the accompanying drawings, using the host vehicle information from the sensors and the captured video images as inputs, and the stored model. The output from the method is a determination of the state of an object in the environment, which can be used in the autonomous control of the host vehicle.

Figure 3:
FIG. 3 is an example of a scene captured by a camera that include an object, in this case a passenger car.
Figure 4:
FIG. 4 is a depiction of an edge detected image obtained from the image of FIG. 3.

In a first step of the method, an image frame is captured. This provides a 2D representation of the environment in front of the host vehicle. FIG. 3 is an example of a captured image of a car. The image is then processed to identify the position and orientation of edges in the image. A Sobel type filter may be used to perform this process function. An edge detected image corresponding to FIG. 3 is shown in FIG. 4.

Figure 5:
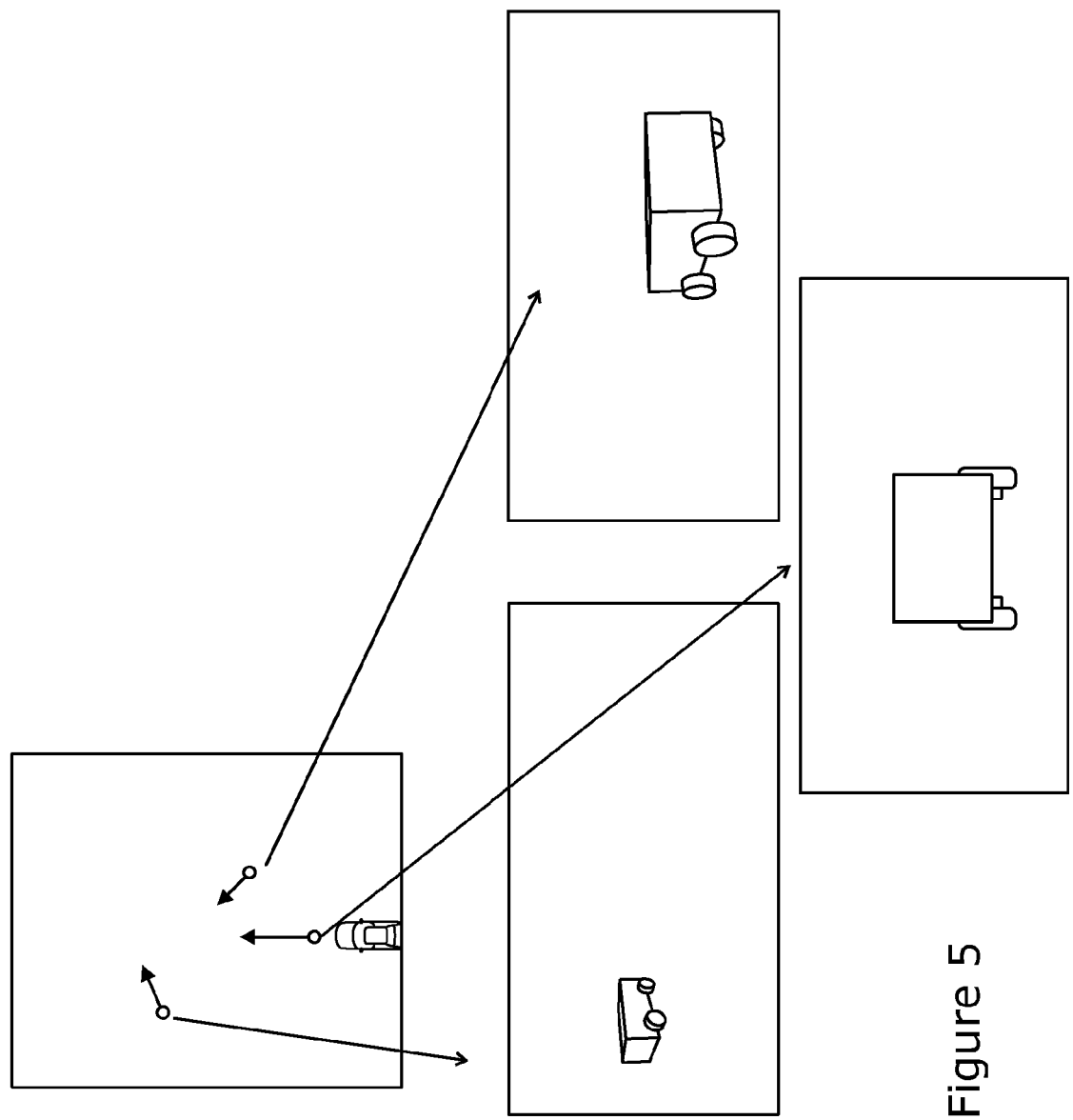
FIG. 5 represents the outline of objects that may be in the captured image as represented by a set of three particles.

In a next step, a set of particles is generated. This step could be performed prior to capturing the image, in parallel, or afterwards. Initially, particles are generated at a large number of random or pseudo-random locations in a parameter space, or regularly scattered within the parameter space. This parameter space may have as many dimensions (or classes) as desired. Typically these dimensions may include location (in a three dimensional X-Y-Z frame), orientation within the X-Y-Z space, speed v and its direction, acceleration and jerk and/or dimensions from which the fuzzy model can be scaled. FIG. 5 shows three examples of particles and the corresponding locations of vehicles defined by the parameters of the particles.

The method uses a fuzzy model of an object that is being looked for, in this example it is assumed that the method is looking for a passenger car. The fuzzy model is made up of a collection of geometric objects, including straight lines and circles in 3D space, each of which has an associated probability distribution or fuzziness in 3D space to take account of the variable relative position or direction or strength of these objects in different types, makes or models of passenger car. In effect these shapes define common features such as wheels and the roofline, and the range of relative sizes and locations of these shapes. The wheels may be further of closer together depending on the wheelbase for instance, and the vertical distance from the wheel centre to the roof line will vary between a sports car and a sports utility vehicle.

Figure 6:
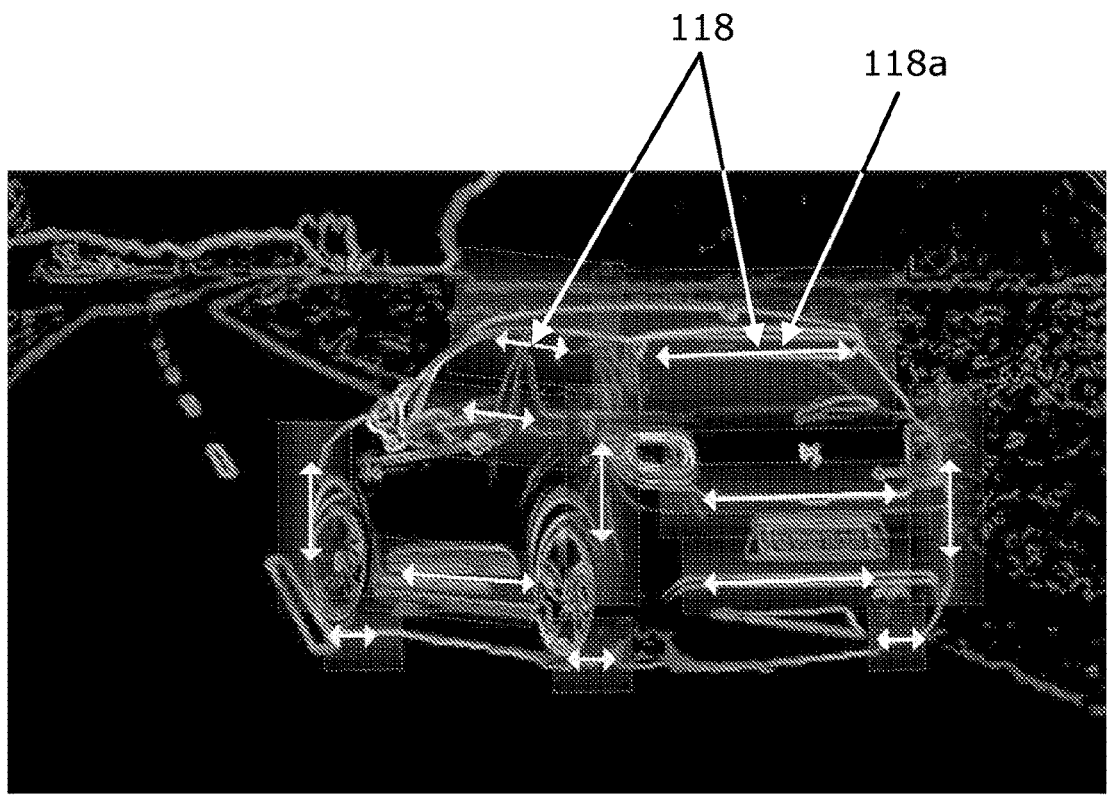
FIG. 6 is a representation of a fuzzy model of a passenger car that may be used in the example of the invention showing the straight edges in the model and a fuzziness applied to each edge.
Figure 7:
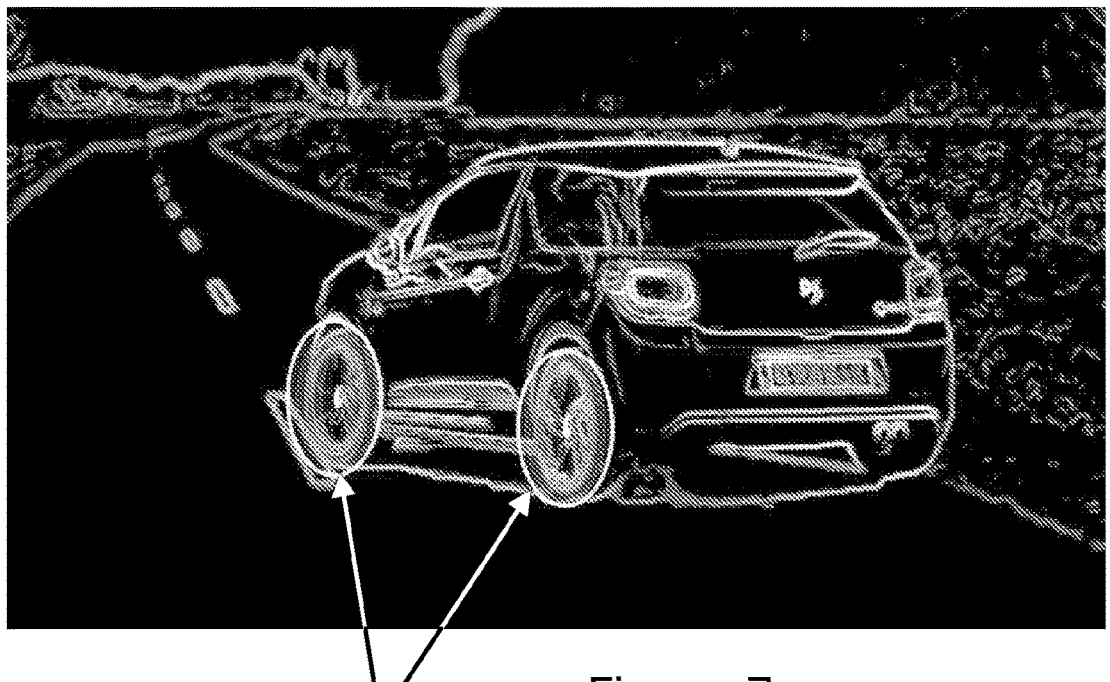
FIG. 7 is another depiction of the image of the model showing another form of edges based upon the centre-point of a wheel and a fuzziness given to its predicted diameter.

The probability distribution or fuzziness of each edge represents a range of positions where it would be expected to find the edge of the geometric feature in the image if a passenger car is present. This can be seen in FIG. 6 in respect of the location characteristic of various straight edges 118 on the vehicle and in FIG. 7 for the edges 120 of wheels or tyres on the vehicle.

Figure 8:
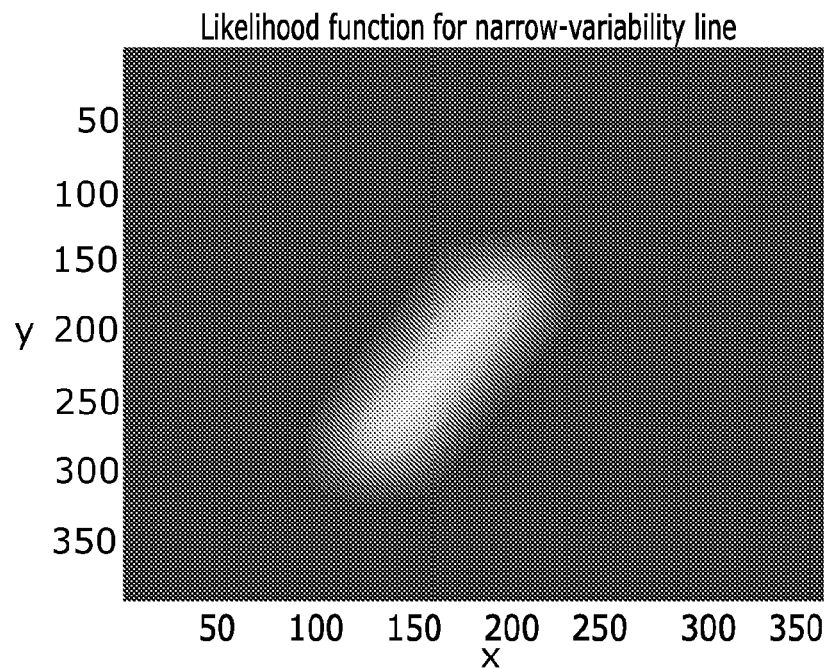
FIG. 8 is an example of a likelihood function which has a probability distribution with a wide spread.

In this example, it can be seen that the roof edge has a high width or fuzziness represented by the wide shading over the edge because it is quite likely that it could be present in the image in any one of wide range of positions. This is because there is a wide variation in heights of passenger vehicles. The distribution of the likelihood function for an edge with a wide range of possible locations is shown in FIG. 8. This likelihood function is a probability distribution which can be visualized by plotting on an X-axis location in the image of the edge against the probability that it is located at that location on the Y-axis. A centre value can be seen at the zero value on the X-axis which corresponds to the most likely height across the set of possible passenger cars that could be found in a scene, relative to a predefined reference point on the object such as its geometric centre.

In the case of a lower edge, there is much less variation in position between different vehicles and so this edge has a much narrower width or can be considered to be less fuzzy. The likelihood function for this type of edge can be seen in FIG. 9 as a different probability distribution.

Whilst the Figures show the fuzziness for location (it is simple to show that in the flat images that accompany this text) each edge in the 3D fuzzy model is also assigned a likelihood function that relates to the direction (i.e. orientation in space) of the edge, and the strength of the edge. These will be plotted along the X axis of the likelihood functions in place of the location. These characteristics are entirely independent in width and so the likelihood functions will also be independent. Both the roof edge and lower body edge will generally be horizontal for all passenger cars and so the direction likelihood function will be very narrow for those edges. Edges corresponding to the tail of the vehicle, on the other hand, can vary greatly and will therefore be assigned likelihood functions that are much fuzzier.

Based on the particle parameters the fuzzy model is projected into the image plane at a location and orientation indicated by the particle parameters. The parameters may require the model to be scaled, rotated and then distorted to fit the image plane of the camera. The result of this projection is a fuzzy 2D image of the model expressed in terms of centre value for each edge and the fuzziness of each edge defined by the set of likelihood functions.

The model, when mapped to the 2D image plane, will define a set of probability values for each pixel in the image. This is done as explained below by calculating from a known function (e.g. a normal distribution curve) or looking up the likelihood value at each pixel location for every mapped line in the 3D model.

The likelihood values are then combined as shown in the following Psuedo code:
For each particle
    For each projected edge feature
        For each pixel position
            Calculate likelihood value "a" based on edge magnitude
            Calculate likelihood value "b" based on edge orientation
            Calculate likelihood value "c" based on edge distance
            Calculate a combined pixel likelihood value by multiplying a, b and c.
        Calculate a combined edge likelihood value by summing all the pixel likelihood values
    Calculate a combined particle likelihood value by multiplying the edge likelihood values.

Specifically, the pseudo code when executed causes the processor, for each pixel in the exemplary 2D image of the 3D fuzzy model, to calculate three probability values as follows:
    an edge location value representing the probability that the pixel or a region around the pixel corresponds to a location near an edge defined by the model (as each edge has a width, there will be a band in the image from one pixel wide to many pixels wide depending on the width and the position of the particle in space whereby there is a high probability that an edge in this band is an edge of an object that is being looked for);
    an edge direction value representing the probability that an edge in an object has a given angular orientation at that point in the image or in a region surrounding the pixel; and
    an edge strength value indicating the probable strength of an edge present in the image.

Once these values have been mapped to the image plane, the pixels in the image are analyzed. The aim of the analysis is to generate a signal representing the probability that a particle is correctly representing the state of an object or is close to the state of an object, or if the particle has a very low probability of representing identifying the state of an object. Based on this probability, the set of particles can be updated repeatedly until only a set of particles that truly represent objects is formed.

Having mapped the 3D model into 2D image space, the method then determines a set of edge values for each pixel from the edge detected image. The following three values are assigned to each image pixel in image space (the edge location of the pixel in the image is of course already known but the likelihood value needs to be determined relative to the projected edge position in the image):
    A location value representing a distance between the projected edge model and the pixel location.
    an edge direction value representing the difference in angular orientation between the projected edge model orientation and the orientation of the edge at the pixel; and
    an edge strength value indicating how strong an edge is that is associated with a pixel, derived for example from a continuous measure of the high frequency content of the image in a small region centered on the pixel.

From the 2D grid of probability values and the edge values, the apparatus may then proceed to determine the likelihood that an object is present that fits the model. For each pixel in the edge detected image, each of the three edge values (location, direction and strength) are processed with the corresponding mapped probability values from the fuzzy model to produce an overall likelihood value for that pixel for each of edge direction, location and strength. This is achieved by working out the perpendicular distance from the pixel to the centre line of each fuzzy edge and then looking up the likelihood function for each edge. So for distance, the likelihood function will define a probability that varies as a function of the perpendicular distance, for direction it will define a probability function that varies with the direction assigned to the pixel, and similarly for edge strength the likelihood function will define a probability that varies with the strength assigned to each pixel. In the last two cases, the distance from the edge to the pixel does not affect the probability that is allocated to the pixel.

The three likelihood values for each pixel are then multiplied together to give an overall probability for that pixel. Higher overall values indicate there is a high chance that the pixel is part of one edge of the object that is represented by the particular particle, in this example an edge of a passenger car.

The likelihood values for each pixel are then summed together to give a likelihood value for the predicted edge. The likelihood values for all predicted edges are multiplied together to give a final likelihood value for the region of image that has been processed which gives an overall measure of the likelihood that the particle corresponds to a vehicle as defined by the fuzzy model.

Of course, the skilled person will appreciate that the likelihood values may be combined in many different ways to arrive at the overall combined likelihood values and the above implementation is given merely as an example of one method that is especially well suited to digital signal processing techniques.

As mentioned above, these steps are repeated for each particle in the set. This will produce for each particle a measure of the likelihood that the particle state corresponds to the exact location of an object in the image or is close to the true location of an object. Those with a high probability are retained and with a low probability may be rejected. Of course, the skilled person would understand that it is not necessary to reject (or "resample") particles at every update and it is possible for a full set of particles to persist across several updates with their weights being increasingly refined. The rejection can be triggered when the particles are no longer effective.

The method then calculates a new set of particles informed by the retained set. Particles are generated around those retained particles, and the original particles and the new particles are offset by an amount based on the measured motion of the host vehicle through the environment and by the parameters of the particle around which the new ones are clustered. For instance if the measured motion indicates that the host vehicle is accelerating rapidly, the particles may be offset over a wider space to represent the increased uncertainty in the host vehicle position and velocity.

Whilst a method using one fuzzy model has been described, in a practical system where it is desirable to identify a wide range of different objects, more than one model may be used. A model that corresponds to pedestrians may be used, or a model that corresponds to a different type of vehicle such as a convertible passenger car or lorry may be used.

Also, the skilled person will understand that the model may define only one or two of the three likelihood functions, or may include further likelihood functions in the model.

To better understand the mapping and the determination of the likelihood values for each pixel, examples of the three functions that can be used in the exemplary method for detection of a passenger car will now be explained in more detail referring to the drawings.

Location Likelihood Function

Figure 9:
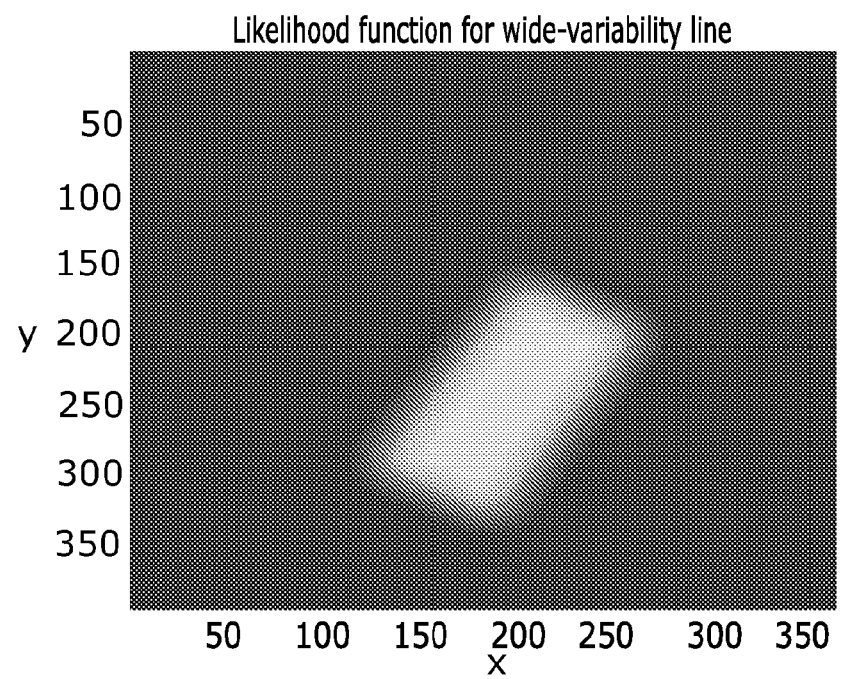
FIG. 9 is an example of a likelihood function which has a probability distribution with a narrow spread.

The distance from a pixel to a predicted edge mapped into the image is measured as the distance from the geometric object in a direction perpendicular to the edge orientation, and may have a wide or narrow likelihood function depending on the expected variability as shown in FIGS. 8 and 9.

For example FIG. 8 shows a likelihood function for a shadow under a vehicle that will have a narrow variability (the position of the shadow under a car is fairly similar for all car types). Note the centre line that is set in the model and corresponds to the location and orientation of the line object and may represent the most common location for a shadow.

On the other hand, a wide variability will be applied to the location of the top of the car as thus could vary a lot depending on the specific vehicle type. For each pixel in the mapped image the probability will be assigned based on the likelihood function and the distance from a centre line for the edge in the model. Again the centre line may be chosen to be the most common location for the edge marking the top of a car.

Direction Likelihood Function

In addition to the location, the model includes a set of likelihood functions defining the location and orientation and strength of each edge in 3D space. For example, the shadow under a car would form an edge with a strong dark-to-light transition going down the back of the vehicle in 3D space. When projected into image space, this will correspond to an edge orientation which is at a specific angle in the image frame. As the predicted orientation is unlikely to vary significantly from this direction for a vehicle in the predicted orientation, a very narrow band of directions centred on a specific angle will be assigned to this edge, as shown in the likelihood function of FIG. 10. The mapping of this edge of the model will result in a likelihood value being assigned to each pixel in the image Edge Strength Likelihood Function Instead of thresholding the edge image, the edge magnitude is also used as an input to the processing of the mapped object values with the edge detected image pixel values. This allows the system to work in variable lighting conditions. An example of a likelihood function for edge strength is shown in FIG. 11.

Simplified Example

To better understand the method a very simplified example is shown in FIGS. 12(*a*) to 12(*e*). As explained above, the method requires as inputs an edge detected image obtained from the 2D camera image, and the projection of the 3D fuzzy model into the camera 2D image plane. In this example a model of a triangle is used, so the method is looking for triangles and will produce particles that track any triangles in the captured images. Let's assume we have only one particle for simplicity.

FIG. 12*a* shows an example of an edge detected image obtained from a captured 2D image. The solid black line shows an image of a square object in that region, which is not to be tracked, and the solid grey line shows an image of a triangular object in that region which the method is trying to track.

Overlaid on this is a green triangle which represents a model of a triangle mapped into the 2D image space. The location and orientation of said triangle is defined by the state of the particle. The shape of the object is defined by the fuzzy 3D model of the triangle and the mapping into the 2D image frame. As can be seen the model and actual object do not exactly match. FIG. 12(a) also shows a still more enlarged portion of the image showing the edges passing through a 10×10 grid of pixels. This shows the distance of a pixel (red arrow) from the centre line of a fuzzy edge in the model (green line).

Each pixel in the edge detected image is assigned a strength value derived from the frequency content of an immediate window of pixels around the pixel. If at least one edge passes through that or the close region to the pixel it will have a high value and if there are no edges in the pixel or immediate surrounding area it will be zero. The value varies continuously as no thresholding is used.

Also, each pixel in the image will be assigned a direction value corresponding to the angle of the edge passing through it. Again, this will be a continuous measure not thresholded. Lastly, a value for the strength of the edge will be assigned depending on the frequency content of the pixel or immediate surroundings.

In a next step, for each pixel and each of the three characteristics the assigned values are multiplied by the three probability values assigned to the corresponding pixel in the 2D mapped model. The three sets of results are shown in FIGS. 12(b) to 12(d). As can be seen in FIG. 12(b) for example several particles are given a value of 1 for location because an edge is present and the probability distribution for the location at that pixel is also 1. Others are given lower values because they do not quite match, and still others a value of zero because the edge in the image is so far from the edge in the model that the probability assigned at to that pixel has dropped to zero, or because the direction of the edge is too far from the model direction.

In the next step, the three calculated probability values for each pixel are multiplied together to produce a single grid of values shown in FIG. 12(e). These are then all averaged to give the overall probability value for the particle. Note that even where no edges of an object in the image are exactly in line with the model edges, there may still be a relatively high likelihood value produced due to the fuzziness of the model that is used.

These steps are repeated for every particle and every line, and from the set of total likelihood values the highest are retained and the lowest rejected.

This method used to process the mapped values with the pixel values may be simply summarised as follows:
For each particle
For each geometric object
  Transform into image space
  For each pixel
    Find where this pixel falls on the x-axis of each likelihood function above
  Look up the three likelihoods
  Multiply them together.
  Average all the pixel values together to get a single likelihood for this image and this particle FIG. 13 shows a second embodiment 200 in which images from Multiple-cameras are used in a method of identifying objects. In this case two cameras 204, 204 are fitted to a host vehicle 202, one at the front left and one at the front right, each capturing an image with a field of view 230 to the front of the vehicle. The images captured from the two cameras are fed to a processor 208 as shown in FIG. 13.

When an image is acquired from one of the cameras, a corresponding camera model is used to project the fuzzy model into that image and the weight of each particle can be updated based on the likelihood calculations from that image.

The system whereby two cameras are used has many advantages over systems which utilize stereo-cameras. Firstly, there is no necessity for the cameras to be precisely aligned or synchronized. Instead, the field-of-view of the cameras may overlap in part, this overlapping part enabling a higher level of accuracy for the system, as shown in FIG. 16. The overlap also gives redundancy over the overlapping part such that the failure of a single camera still allows the system to work in that overlapping area and the remainder of the field-of-view of the working camera. This redundancy is in comparison to a known stereo-camera system whereby the failure of a single camera will result in the failure of the entire system As the cameras essentially function independently, the frame rate, focal length, or resolution of the cameras does not have to be equal. More than two cameras may also be used, such as in the embodiment of FIG. 17. Here, three cameras with different focal lengths provide object detection over a wide area, the central portion of the combined field-of-view being viewed by a long focal-length camera. In this embodiment, the process may be optimised such that the likelihoods of particles relating to objects which are predicted to be visible in the field-of-view of all three cameras are only calculated for the images which provide the most information, i.e. the long and medium focal length cameras. In comparison, the likelihoods of particles predicted to be in a position which is only visible by the wide-angle camera with the short focal length will only be calculated for the short focal-length image.

Where processing power is less limited, it is possible to calculate the likelihoods of each particle for each image, but whilst this would allow greater certainty of object detection, in most cases there will be limited processing power and therefore the limitations described above will be preferred.

Synchronisation of a multi-camera system is avoided as the particle weights from each image can be updated independently.

The image capture from each camera does not need to be synchronised in time as the particle weights can be updated from each image independently. The predicted positions of edge features in an image are calculated for the time the image was captured.

If one camera fails, the system provides graceful degradation (as opposed to traditional stereo vision cameras which fail completely).

When 2 cameras are in operation, the system will estimate the range to an object with information from 2 viewpoints and can provide accurate estimation of range. (E.g. The system effectively operates with a combination of object scale and feature "triangulation". The "triangulation" is not explicitly calculated but is actually performed by updating the particle weights with information from both cameras.)

When 1 camera fails, the system can still use information from the remaining camera but the information about the object is only available from 1 viewpoint. This degrades the range accuracy but the system can still detect and estimate the object range. (E.g. The system effectively falls back to using information about object scale only).

This is achieved without an explicit "mono-fallback"—the exact same system operates, but "realises" it is operating with less good information, and will therefore produce tracking results which are "as good as possible", and also provide information about any lack of accuracy (in the form of wider probability densities around targets)

The method of the present invention may offer one ore more of the following benefits over the prior art:
- No reliance on computationally expensive Hough transforms to search the image space with template shapes, or complex Machine Learning Algorithm to recognize the shapes
- No reliance on a ground plane assumption (or any other assumption about the structure of the environment in which the object exists).
- Good trade off possible between timing constraints and processing power/accuracy due to selectable number of particles
- Does not require extensive "machine-learning" process during development
- Computations of particle state updates can be easily parallelized
- Easier treatment of analytic shapes (i.e. planar or 3-dimensional)
- Easily extendable to more cameras to increase robustness or field of view and provide graceful degradation of performance in the event of a single camera failure.
- Ability to include higher order target motion models (that directly estimate velocity, acceleration) and also directly estimate orientation of objects.
- Easier to embed in low-cost hardware (e.g. FPGA, low-cost DSP) due to high degree of parallelism.
- Easy to combine the tracking system with other kind of sensors (e.g. Radar, Infrared Cameras) to fuse the measurements after defining the appropriate likelihood function
- Possibility to extend it to general (i.e. non analytical) shapes
- Scales easily for more complex systems

The invention claimed is:

1. A method of detecting objects located in an environment around a host object, comprising the steps of:
   (a) obtaining at least one 2D image of a scene from an image capture device fitted to the host object,
   (b) generating a set of particles that each comprise a set of parameters that define a state of at least one object that may be present in the scene,
   (c) calculating an edge strength and edge direction for each pixel of the at least one 2D image; and
   for each particle in the set of particles:
   (d) generating a 3D probabilistic model of the at least one object that is associated with the particle, the 3D probabilistic model defining a set of edges of the at least one object, each edge in the 3D probabilistic model defined by at least one likelihood function defining a probabilistic distribution of at least one characteristic of the edge;
   (e) mapping the likelihood functions of the 3D probabilistic model into a 2D plane of the at least one 2D image as a function of the set of parameters of the particle; and
   (f) processing the edge strength and edge direction values produced in step (c) with probability values mapped in step (e) to determine a likelihood that the particle defines the state of the at least one object present in the environment.

2. The method of claim 1 in which the likelihood functions defining each edge comprise one or more of the following: a probabilistic distribution of a location of the edge, a probabilistic distribution of a direction of the edge and a probabilistic distribution of a strength of an edge.

3. The method of claim 1, in which the step (C) of calculating an edge direction and edge strength is performed using a Sobel mask.

4. The method of claim 1, in which the set of parameters defining the state of the at least one object include one or more of an overall location in 3D space of the at least one object relative to a location of the host object, an orientation and a direction of travel and speed of travel of the at least one object through the 3D space relative to the 3D space or relative to the host object, a rate of acceleration of the at least one object relative to the host vehicle, and ambient light conditions.

5. The method of claim 1, in which all edges in the at least one 2D image obtained in step (c) that lie within a region or window corresponding to the mapped 2D plane are processed in step (f).

6. The method of claim 1, in which the step (e) of mapping comprises assigning a set of probability values to each pixel in the at least one 2D image, each one being defined by a set of likelihood functions for the 3D probabilistic model.

7. The method of claim 1, in which a likelihood value for each particle is calculated using the following sequence of steps expressed in pseudo code:
   for each particle,
   for each projected edge feature,
   for each pixel position
   calculate likelihood value "a" based on edge magnitude
   calculate likelihood value "b" based on edge orientation
   calculate likelihood value "c" based on edge distance
   calculate a combined pixel likelihood value by multiplying "a", "b" and "c"
   calculate a combined edge likelihood value by summing all pixel likelihood values
   calculate a combined particle likelihood value by multiplying edge likelihood values.

8. The method of claim 1, in which a sequence of captured images are captured from a single image capture device.

9. The method of claim 1 which comprises capturing images from more than one image capture device, each having a different field of view of the scene, and comprising applying a different transform to the 3D probabilistic model for each image capture device to enable correct mapping of the likelihood functions into an image space of each image capture device.

10. The method of claim 9 in which each image capture device in use captures a view of the scene from a different location and orientation, each view overlapping so that predicted objects are present in captured images from the image capture devices.

11. The method of claim 9, which comprises monitoring a status of each image capture device, and in an event that one is faulty, using only images from a non-faulty device to produce edge detected images for processing with a mapped fuzzy model.

12. An object detection apparatus for locating at least one object in an environment around a host object, comprising:
   (a) an image capture device fitted to the host object which in use obtains at least one 2D image of the environment,
   (b) a processing means arranged in use to generate a set of particles that each comprise a set of parameters that define a state of the at least one object that may be present in a scene,
   (c) calculating an edge strength and edge direction for each pixel of a captured 2D image for production of an edge image; and in which the processing means is further arranged in use to process each particle in the set of particles by the following steps:

(d) generating a 3D probabilistic model of the at least one object that is associated with the particle, the 3D probabilistic model defining a set of edges of the at least one object, each edge in the 3D probabilistic model defined by at least one likelihood function defining a probabilistic distribution of at least one characteristic of the edge;

(e) mapping the likelihood functions of the 3D probabilistic model into a 2D plane of the captured 2D image as a function of the set of parameters of the particle; and (f) processing edges identified in the captured 2D image in step (c) with probability values mapped in step (e) to determine a likelihood that the particle defines the state of the at least one object present in the environment.

* * * * *